Sept. 18, 1945.  J. B. MOORE  2,384,954
RAIN GAUGE
Filed Dec. 8, 1944  2 Sheets-Sheet 1
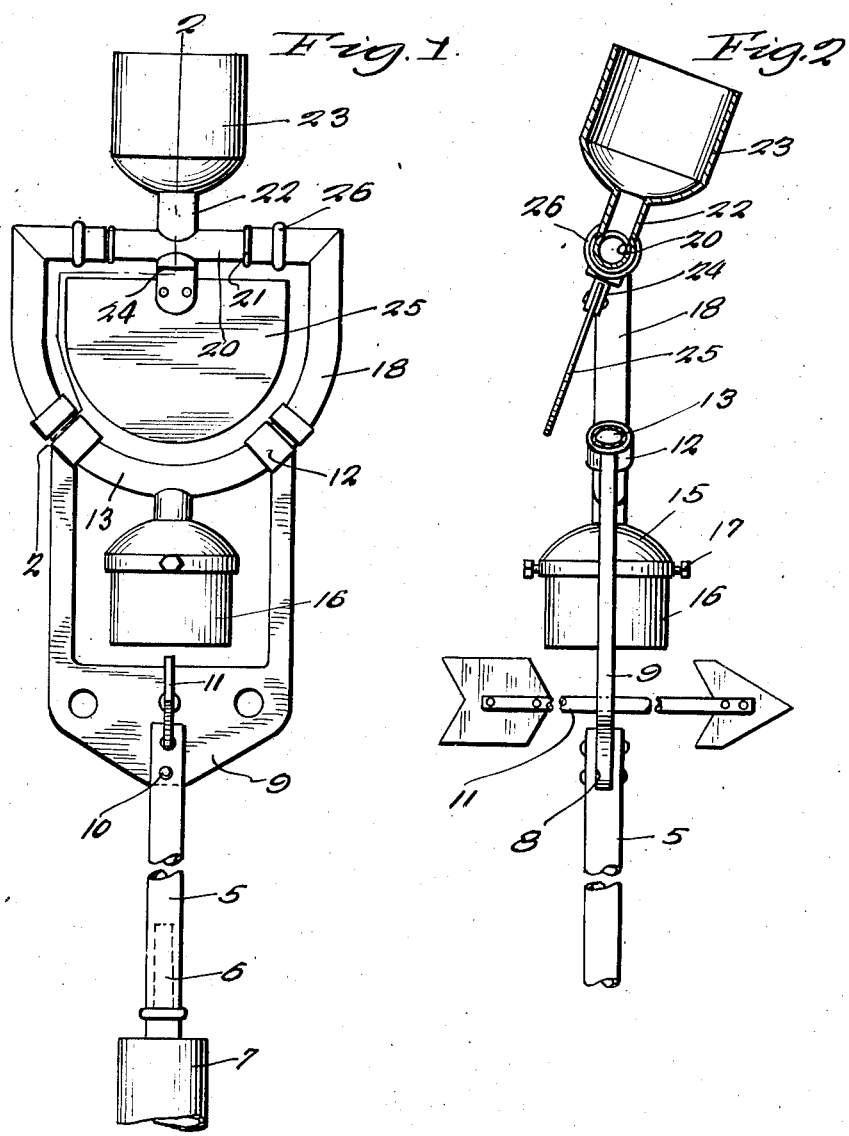
Inventor
James B. Moore,
By Clarence A. O'Brien
and Harvey B. Jacobson
Attorneys Sept. 18, 1945.  J. B. MOORE  2,384,954
RAIN GAUGE
Filed Dec. 8, 1944   2 Sheets-Sheet 2
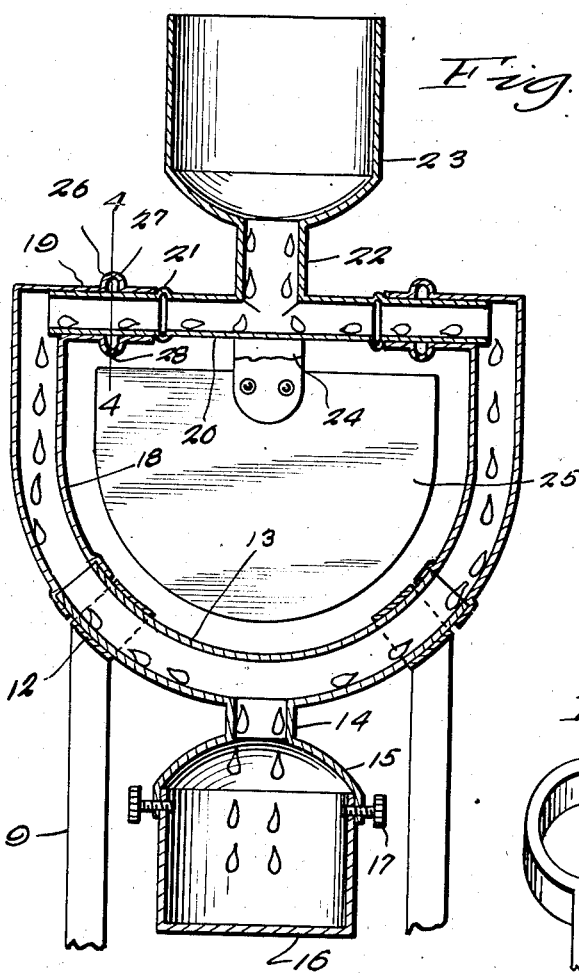
Inventor
James B. Moore, Patented Sept. 18, 1945

2,384,954

UNITED STATES PATENT OFFICE 2,384,954

RAIN GAUGE

James B. Moore, Hamilton, Mo.

Application December 8, 1944, Serial No. 567,222

1 Claim. (Cl. 73—171)

The present invention relates to new and useful improvements in gauges for measuring the amount of rainfall and has for its primary object to provide a receiving cup together with means responsive to the wind for moving the cup with its open mouth in a direction toward the wind to prevent the wind from driving the rain across the top of the cup and thus assure the entrance of the rain into the receiving cup to more accurately gauge the amount of the rainfall.

More specifically the invention embodies the provision of a pivotally mounted receiving cup swingable on a horizontal axis together with a blade responsive to the wind for swinging the cup with its mouth in a direction facing the wind and a weather vane arranged to maintain the blade transversely of the direction of the wind.

A further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a front elevational view.

Figure 2 is a vertical sectional view through the receiving cup taken substantially on a line 2—2 of Figure 1.

Figure 3 is an enlarged vertical sectional view through the receiving and collecting cup and a communicating pipe therefor.

Figure 4 is a transverse sectional view through the pivotal support for the receiving cup and taken substantially on a line 4—4 of Figure 3, and Figure 5 is a fragmentary perspective view of one of the supporting posts for the upper portion of the gauge.

Referring now to the drawings in detail wherein for the purpose of illustration I have disclosed a preferred embodiment of the invention the numeral 5 designates a hollow post rotatably supported at its lower end on an upstanding pin 6 rising from a suitable supporting structure 7. The upper end of the post is bifurcated as shown at 8 for receiving the lower end of a U-shaped frame 9 fixedly secured to the post by means of the rivets or the like 10.

The lower portion of the frame 9 has a weather vane 11 of conventional construction secured in a horizontal position therein.

The upper ends of the U-shaped frame 9 are formed with sockets 12 supporting the ends of an arcuate-shaped pipe 13. A tube 14 is formed at the lower central portion of the pipe 13 which communicates with a cover 15 and to which a collecting cup 16 is attached by means of set screws 17.

The outer ends of the pipe 13 are telescopically received in the lower ends of upwardly extending pipes 18 having inwardly projecting extensions 19 at their upper ends.

The pipe extensions 19 telescopically receive the ends of a horizontal pipe 20 for rocking movement in said extensions. The pipe 20 is formed with annular beadings or ribs 21 adapted to abut the ends of the extensions 19 to prevent horizontal sliding movement of the pipe in said extensions.

A vertically extending tube 22 rises from an intermediate portion of the pipe 20 and on the upper end of which is formed a receiving cup 23.

A bracket 24 extends downwardly from the central portion of the pipe 20 and to which a blade 25 is attached at its upper edge, the blade 25 being of sufficient weight to counter-balance the cup 23 and to maintain the latter in its upwardly extended position.

The receiving cup 23 is open at its top to form a mouth for receiving rainwater which passes downwardly through the tube 22 and outwardly at either end of the pipe 20 into the pipes 18 and 13 and thence into the receiving cup 16.

The pipe extensions 19 are formed with an outwardly pressed beading 26 forming an internal annular groove 27 the lower portion of which is provided with a drain opening 28. Accordingly, rain water entering the pipe extensions 19 along the pipe 20 will be collected in the groove 27 and drained through the opening 28 without permitting the water to enter the pipes 18, thus limiting the measuring of the rainfall to the water collected in the cup 23.

The weather vane 11 extends in a direction at right angles to the plane of the blade 25 and accordingly the surface of the blade 25 is maintained in a position transversely with respect to the direction in which the wind is blowing and thus is effectively subjected to the pressure exerted by the wind. Due to the pivotal mounting of the blade 25 and the receiving cup 23 the wind will force the blade 25 in a direction to extend the mouth of the receiving cup 23 in a direction toward the wind, as shown more clearly in Figure 2 of the drawings, whereby rain water will not be blown across the top of the receiving cup, but will enter the receiving cup so as to more accurately measure the amount of rainfall.

It is believed that the details of construction and manner of use of the device will be readily understood from the foregoing, without further detailed explanation.

Having thus described the invention, what I claim is:

A rain gauge comprising a rotatable support, a weather vane carried by the support and responsive to changes in the direction of the wind to turn the support on a vertical axis, a collecting cup attached to the support, a vertically disposed U-shaped conduit connected to the collecting cup, said conduit having inwardly projecting upper ends, a pipe having its ends telescopically journaled in the ends of said conduit, annular grooves within the inturned ends of the conduit and having drain openings in the lower portion thereof to drain water entering the upper ends of the conduit along the outer surface of the pipe, a rain receiving cup rising from and connected to the pipe, said receiving cup having fluid communication through the conduit and pipe with the collecting cup and a flat pendulous member suspended from the pipe and maintained in a position transversely of the direction of the wind by said weather vane, said pendulous member being responsive to pressure of the wind to tilt the receiving cup toward the wind.

JAMES B. MOORE.